United States Patent
Shan et al.

(10) Patent No.: US 9,408,191 B2
(45) Date of Patent: Aug. 2, 2016

(54) COMMUNICATION TERMINAL AND METHOD FOR CONTROLLING DATA COMMUNICATION

(71) Applicants: Beijing Lenovo Software Ltd, Beijing (CN); Lenovo (Beijing) Co., Ltd., Beijing (CN)

(72) Inventors: Wenying Shan, Beijing (CN); Fuliang Zhang, Beijing (CN); Rong Zhang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 628 days.

(21) Appl. No.: 13/866,330

(22) Filed: Apr. 19, 2013

(65) Prior Publication Data

US 2013/0279436 A1   Oct. 24, 2013

(30) Foreign Application Priority Data

Apr. 23, 2012 (CN) .......................... 2012 1 0121011

(51) Int. Cl.
*H04W 72/04* (2009.01)
*H04W 72/12* (2009.01)
*H04W 88/06* (2009.01)

(52) U.S. Cl.
CPC ...... *H04W 72/0406* (2013.01); *H04W 72/1215* (2013.01); *H04W 88/06* (2013.01)

(58) Field of Classification Search
CPC .............................. H04W 84/18; H04W 84/12
See application file for complete search history.

(56) References Cited

U.S. PATENT DOCUMENTS

| 7,930,010 | B2 | 4/2011 | Johansson et al. |
| 2008/0102760 | A1 | 5/2008 | McConnell et al. |
| 2009/0017756 | A1* | 1/2009 | Tsfaty ................... H04L 1/1867 455/41.2 |
| 2009/0109117 | A1 | 4/2009 | Johansson et al. |
| 2010/0279709 | A1* | 11/2010 | Shahidi ................ H04B 1/3805 455/456.2 |

FOREIGN PATENT DOCUMENTS

| CN | 101420235 A | 4/2009 |
| CN | 201478455 U | 5/2010 |
| CN | 102404018 A | 4/2012 |

OTHER PUBLICATIONS

First Chinese Office Action regarding Application No. 201210121011.6 dated Sep. 6, 2015. English translation provided by http://globaldossier.uspto.gov/.

* cited by examiner

*Primary Examiner* — Andrew Lai
*Assistant Examiner* — Zhiren Qin
(74) *Attorney, Agent, or Firm* — Harness, Dickey & Pierce, P.L.C.

(57) ABSTRACT

A communication terminal and a method for controlling data communication are provided by embodiments of the invention, relating to the field of communication technology. The communication terminal comprises: a first communication module adapted to, when transmitting a first communication signal to a first antenna, generate a first communication control signal for controlling a second communication module; and a second communication module adapted to receive the first communication control signal, and stop the transmission of a second communication signal between the second communication module and a second antenna in accordance with the first communication control signal. In the embodiments of the invention, respective signals of the first communication module and the second communication module are controlled to be transmitted in different times, thus signal interferences between the communication modules on the terminal are reduced.

6 Claims, 5 Drawing Sheets

COMMUNICATION TERMINAL AND METHOD FOR CONTROLLING DATA COMMUNICATION

The present application claims the priority of Chinese Patent Application No. 201210121011.6, titled "COMMUNICATION TERMINAL AND METHOD FOR CONTROLLING DATA COMMUNICATION", filed with the Chinese State Intellectual Property Office on Apr. 23, 2012, the entire disclosure of which are incorporated herein by reference.

FIELD OF THE INVENTION

The present invention relates to the field of communication technology, particularly to a communication terminal and a method for controlling data communication.

BACKGROUND OF THE INVENTION

Currently, mobile terminals support more and more functions, and user's demand on ultra-thin and minimal-sized communication terminals is increased. To reduce the size of the terminal, a mobile terminal is provided in the prior art, which supports three functions, i.e., GPS (Global Positioning System), BT (Bluetooth) and WLAN (Wireless Local Area Networks), by multiplexing a single antenna.

However, when the existing mobile terminal implements the above functions of the GPS, BT and WLAN, on one hand, the GPS LNA (Low Noise Amplifier) has a lower input power, which is usually no more than −20 dBm, and the background noise should be less than −85 dBm/Hz, however, during the transmission of BT/WLAN, the power of the BT is 0 dBm and the power of the WLAN is about 15 dBm, and the background noise of the BT/WLAN will up to −65 dBm/Hz. Therefore, during the transmission of the BT/WLAN, the input of the GPS LNA becomes bigger so that the GPS LNA enters a saturated zone, and thus the signal of the GPS is interfered and the GPS can not operate normally. On the other hand, the GSM (Global System for Mobile Communications) on the terminal also has a large transmitting power, and when a GSM signal is transmitted, signals of the GPS, BT and WLAN on the terminal are interfered and thus the GPS, BT and WLAN can not operate normally.

SUMMARY OF THE INVENTION

A communication terminal and a method for controlling data communication are provided by embodiments of the present invention, thus signal interferences between the communication modules on the terminal are reduced.

For the purposes mentioned above, following solutions are adopted in the embodiments of the present invention.

On one hand, a communication terminal is provided, the terminal includes:

a first antenna, adapted to receive a first communication signal from a first correspondent node or transmit a first communication signal to the first correspondent node;

a first communication module, adapted to receive the first communication signal from the first antenna after the first antenna receives the first communication signal from the first correspondent node, or transmit the first communication signal to the first antenna before the first antenna transmits the first communication signal to the first correspondent node;

a second antenna, adapted to receive a second communication signal from a second correspondent node or transmit a second communication signal to the second correspondent node; and a second communication module, adapted to receive the second communication signal from the second antenna after the second antenna receives the second communication signal from the second correspondent node, or transmit the second communication signal to the second antenna before the second antenna transmits the second communication signal to the second correspondent node;

where the first communication module is further adapted to, when transmitting the first communication signal to the first antenna, generate a first communication control signal for controlling the second communication module; and the second communication module is further adapted to receive the first communication control signal, and stop the transmission of the second communication signal between the second communication module and the second antenna in accordance with the first communication control signal.

A method for controlling data communication is provided, which is applied to a communication terminal, the communication terminal includes:

a first antenna adapted to receive a first communication signal from a first correspondent node or transmit a first communication signal to the first correspondent node;

a first communication module adapted to receive the first communication signal from the first antenna after the first antenna receives the first communication signal from the first correspondent node, or transmit the first communication signal to the first antenna before the first antenna transmits the first communication signal to the first correspondent node;

a second antenna adapted to receive a second communication signal from a second correspondent node or transmit a second communication signal to the second correspondent node;

a second communication module adapted to receive the second communication signal from the second antenna after the second antenna receives the second communication signal from the second correspondent node, or transmit the second communication signal to the second antenna before the second antenna transmits the second communication signal to the second correspondent node;

the method includes:

when the first communication module transmits the first communication signal to the first antenna, generating a first communication control signal for controlling the second communication module; and receiving, by the second communication module, the first communication control signal; and stopping, by the second communication module, the transmission of the second communication signal between the second communication module and the second antenna in accordance with the first communication control signal.

In the embodiments of the present invention described in the above solutions, the first communication module transmits the first communication control signal to the second communication module, so that when the first communication module transmits the first communication signal, the second communication module stops the transmission of the second communication signal, that is, the respective signals of the first communication module and the second communication module are controlled to be transmitted in different times, thus signal interferences between the communication modules on the terminal are reduced.

BRIEF DESCRIPTION OF THE DRAWINGS

To more clearly illustrate embodiments of the present invention or technical solutions in the prior art, accompanying drawings used in the description of the embodiments and the prior art will be simply introduced below. Obviously, the accompanying drawings in the following description are just some embodiments of the present invention, and other accompanying drawings can be obtained by those skilled in the art in light of these accompanying drawings without any creative efforts.

DETAILED DESCRIPTION OF THE INVENTION

Technical solutions of the embodiments of the present invention will be clearly and completely described below in connection with the accompanying drawings of the embodiments of the present invention. Obviously, the described embodiments are just part but not all of embodiments of the present invention. All of other embodiments obtained according to the embodiments of the present invention by those skilled in the art without any creative efforts should fall within the protection scope of the present invention.

Figure 1:
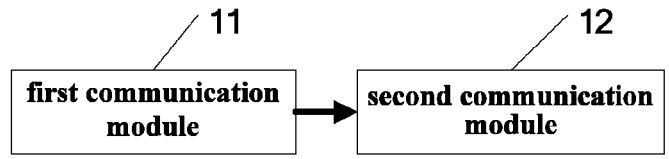
FIG. 1 is a structure diagram of a communication terminal according to an embodiment of the present invention.

As shown in FIG. 1, a communication terminal is provided according to an embodiment of the present invention, including:

a first antenna (not illustrated), adapted to receive a first communication signal from a first correspondent node or transmit a first communication signal to the first correspondent node;

a first communication module 11, adapted to receive the first communication signal from the first antenna after the first antenna receives the first communication signal from the first correspondent node, or transmit the first communication signal to the first antenna before the first antenna transmits the first communication signal to the first correspondent node;

a second antenna (not illustrated), adapted to receive a second communication signal from a second correspondent node or transmit a second communication signal to the second correspondent node; and a second communication module 12, adapted to receive the second communication signal from the second antenna after the second antenna receives the second communication signal from the second correspondent node, or transmit the second communication signal to the second antenna before the second antenna transmits the second communication signal to the second correspondent node;

where the first communication module 11 is further adapted to, when transmitting the first communication signal to the first antenna, generate a first communication control signal for controlling the second communication module; and the second communication module 12 is further adapted to receive the first communication control signal, and stop the transmission of the second communication signal between the second communication module and the second antenna in accordance with the first communication control signal.

Figure 2:
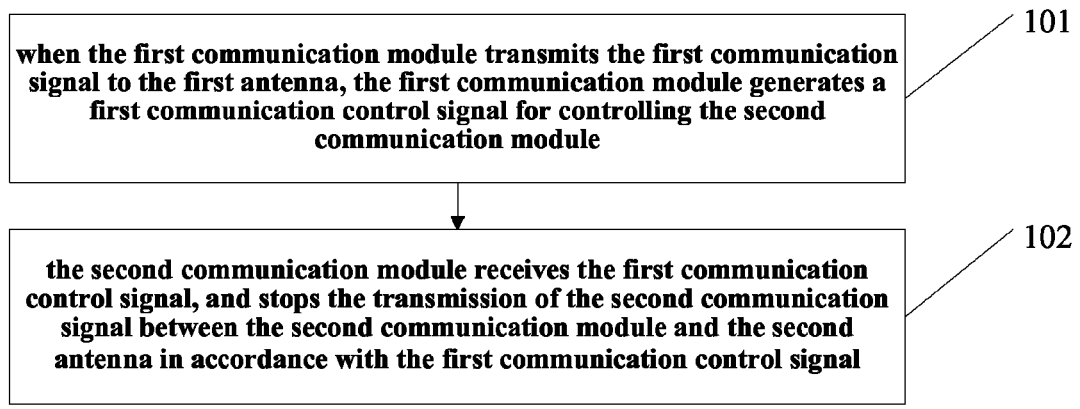
FIG. 2 is a flow chart of a method for controlling data communication according to an embodiment of the present invention.

Accordingly, as shown in FIG. 2, a method for controlling data communication is provided according to an embodiment of the present invention, which is applied to the above communication terminal shown in FIG. 1, and the method includes:

101, when the first communication module transmits the first communication signal to the first antenna, generating a first communication control signal for controlling the second communication module; and

102, receiving, by the second communication module, the first communication control signal, and stopping, by the second communication module, the transmission of the second communication signal between the second communication module and the second antenna in accordance with the first communication control signal.

In the embodiment of the present invention, the first communication module transmits the first communication control signal to the second communication module, so that the second communication module stops the transmission of the second communication signal when the first communication module transmits the first communication signal, that is, the respective signals of the first communication module and the second communication module are controlled to be transmitted in different times, thus signal interferences between the communication modules on the terminal are reduced.

The First Embodiment

Figure 3:
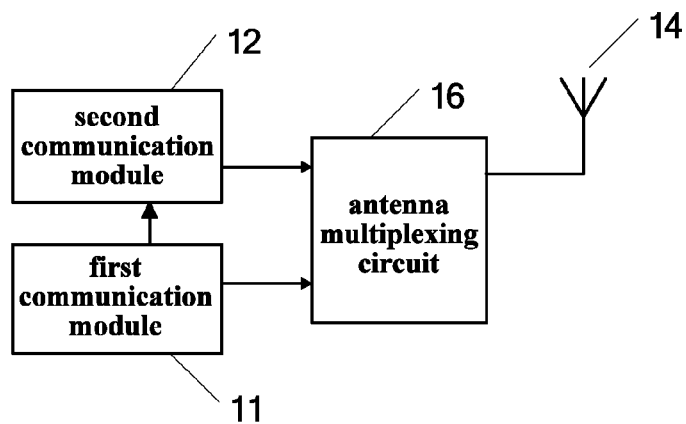
FIG. 3 is a structure diagram of a communication terminal according to a first embodiment of the present invention.

Exemplarily, as shown in FIG. 3, the first antenna and the second antenna are the same antenna 14, and the terminal further includes an antenna multiplexing circuit 16, the first communication module 11 is connected with the antenna via the antenna multiplexing circuit; and the second communication module 12 is connected with the antenna via the antenna multiplexing circuit; and the antenna multiplexing circuit 16 has an end connected with the first communication module and the second communication module, and another end connected with the antenna, for transmitting a wireless communication signal transmitted by either of the first communication module and the second communication module to the antenna, and transmitting a wireless communication signal received by the antenna to a corresponding one of the first communication module and the second communication module.

In particular, the first communication module includes but is not limited to a BT module or a WLAN module, and the second communication module is a GPS module.

Optionally, when the first communication module is a BT module, the first communication control signal transmitted by the BT module is a BT TX signal.

Optionally, when the first communication module is a WLAN module, the first communication control signal transmitted by the WLAN module is a WLAN TX signal.

Specifically, when the second communication module is a GPS module, the second communication module is adapted to receive the first communication control signal, and stop receiving the GPS signal in accordance with the first communication control signal.

Figure 4:
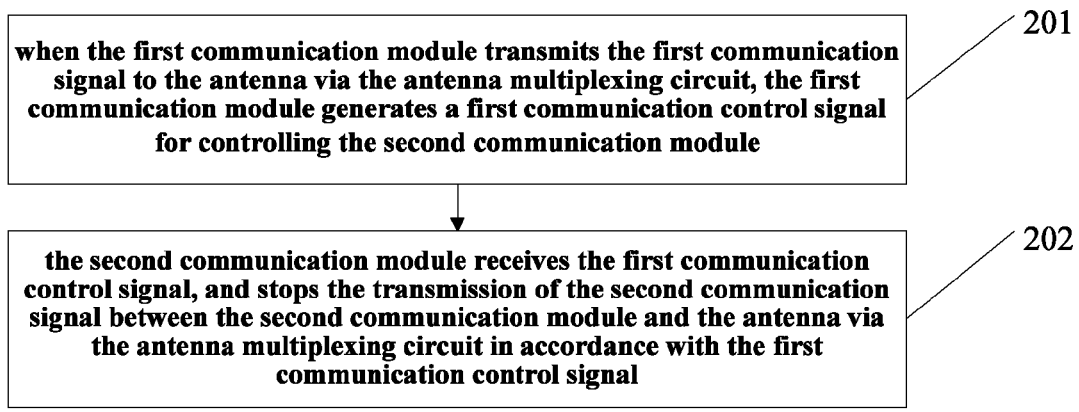
FIG. 4 is a flow chart of a method for controlling data communication, which is applied to the terminal illustrated in FIG. 3, according to the first embodiment of the present invention.

Accordingly, as shown in FIG. 4, a method for controlling data communication is provided according to the embodiment of the present invention, which is applied to the above communication terminal shown in FIG. 3, and the method includes:

201, when the first communication module transmits the first communication signal to the antenna via the antenna multiplexing circuit, generating a first communication control signal for controlling the second communication module; and

202, receiving, by the second communication module, the first communication control signal, and stopping, by the second communication module, the transmission of the second communication signal between the second communication module and the antenna via the antenna multiplexing circuit in accordance with the first communication control signal.

In the embodiment of the present invention, when the first communication module is a BT module or a WLAN module, and the second communication module is a GPS module, the BT module (or the WLAN module) and the GPS module can work together, and signal interferences between the modules when the modules work together are reduced.

Figure 5:
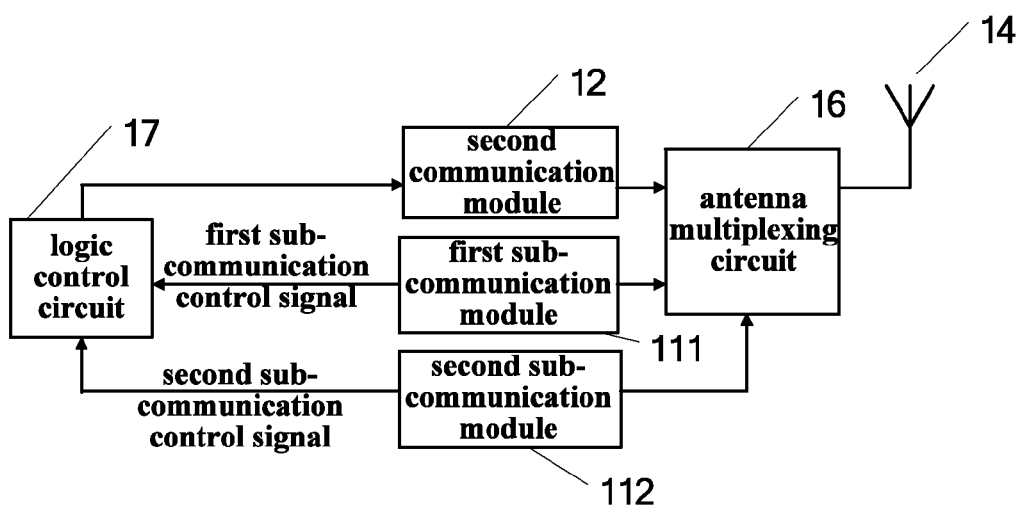
FIG. 5 is a structure diagram of another communication terminal according to the first embodiment of the present invention.

Exemplarily, as shown in FIG. 5, the first communication module includes a first sub-communication module 111 and a second sub-communication module 112, and the terminal further includes a logic control circuit 17.

The first sub-communication module 111 is connected with the second communication module via the logic control circuit, and is adapted to transmit a first sub-communication signal to the first antenna, and when transmitting the first sub-communication signal, generate a first sub-communication control signal and transmit the first sub-communication control signal to the logic control circuit.

The second sub-communication module 112 is connected with the second communication module via the logic control circuit, and is adapted to transmit a second sub-communication signal to the first antenna, and when transmitting the second sub-communication signal, generate a second sub-communication control signal and transmit the second sub-communication control signal to the logic control circuit.

The logic control circuit 17 is adapted to receive the first sub-communication control signal and the second sub-communication control signal, and generate the first communication control signal for controlling the second communication module in accordance with the first sub-communication control signal and the second sub-communication control signal.

Optionally, the above first sub-communication module is a BT module, the above second sub-communication module is a WLAN module, and the second communication module is a GPS module.

Optionally, the above first sub-communication module is a WLAN module, the above second sub-communication module is a BT module, and the second communication module is a GPS module.

It should be noted that the logic control circuit may be an independent processing unit, or may adopt, but is not limited to, a logic AND circuit, and is used to generate a target communication control signal in accordance with each of the received communication control signals, for controlling signal transmission of the second communication module.

In particular, there are three possible situations when the logic control circuit generates the first communication control signal in accordance with the first sub-communication control signal and the second sub-communication control signal: the generated first communication control signal is the first sub-communication control signal if the logic control circuit receives only the first sub-communication control signal; or the generated first communication control signal is the second sub-communication control signal if the logic control circuit receives only the second sub-communication control signal; or the first communication control signal is generated by combining the first sub-communication control signal and the second sub-communication control signal if the logic control circuit receives both the first sub-communication control signal and the second sub-communication control signal.

Figure 6:
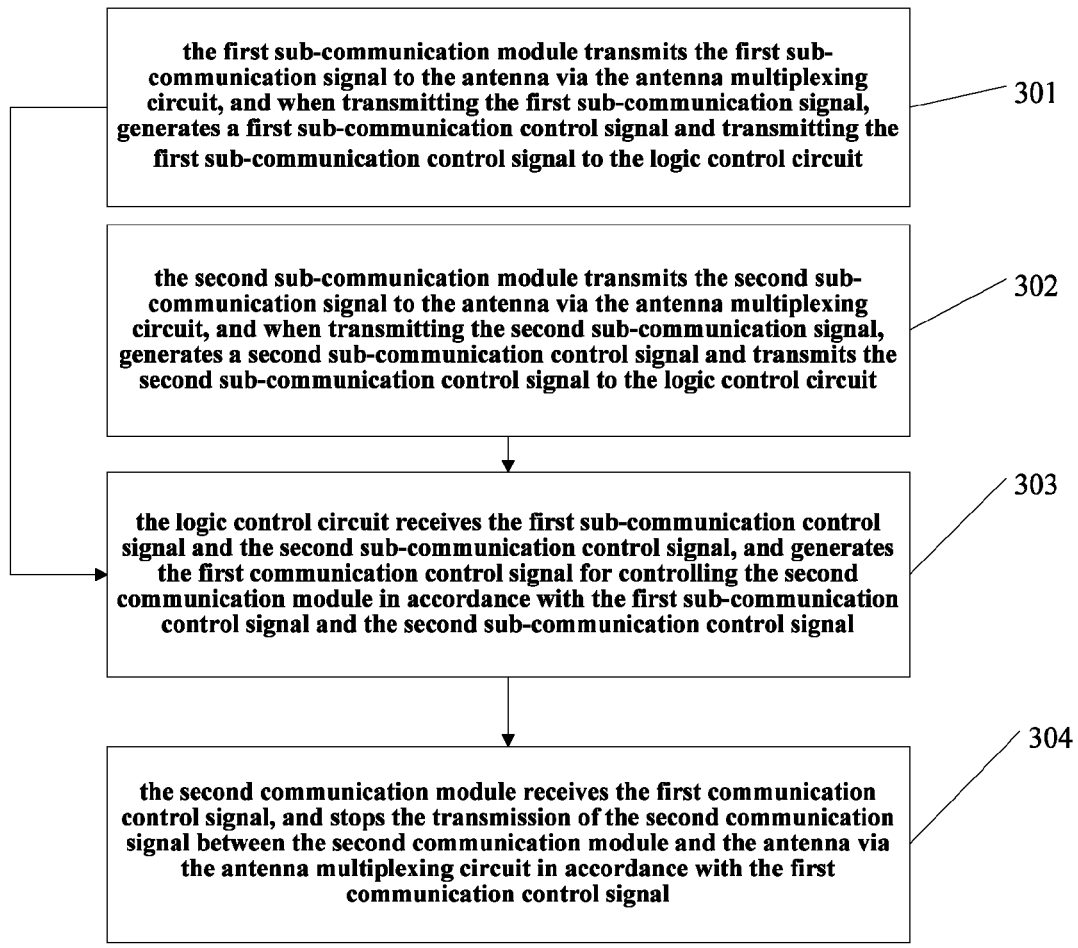
FIG. 6 is a flow chart of a method for controlling data communication, which is applied to the terminal illustrated in FIG. 5, according to the first embodiment of the present invention.

Accordingly, as shown in FIG. 6, a data communication method is provided according to the embodiment of the present invention, which is applied to the above communication terminal shown in FIG. 5, and the method includes:

301, the first sub-communication module transmits a first sub-communication signal to the antenna via the antenna multiplexing circuit, and when transmitting the first sub-communication signal, generates a first sub-communication control signal and transmits the first sub-communication control signal to the logic control circuit;

302, the second sub-communication module transmits a second sub-communication signal to the antenna via the antenna multiplexing circuit, and when transmitting the second sub-communication signal, generates a second sub-communication control signal and transmits the second sub-communication control signal to the logic control circuit;

303, the logic control circuit receives the first sub-communication control signal and the second sub-communication control signal, and generates the first communication control signal for controlling the second communication module in accordance with the first sub-communication control signal and the second sub-communication control signal; and

304, the second communication module receives the first communication control signal, and stops transmission of the second communication signal between the second communication module and the antenna via the antenna multiplexing circuit in accordance with the first communication control signal.

In the embodiment of the present invention, when the above first sub-communication module is a BT module, the above second sub-communication module is a WLAN module, and the second communication module is a GPS module, or when the above first sub-communication module is a WLAN module, the above second sub-communication module is a BT module, and the second communication module is a GPS module, the BT module, the WLAN module and the GPS module can work together, and signal interferences between the modules when the modules work together are reduced.

The Second Embodiment

Figure 7:
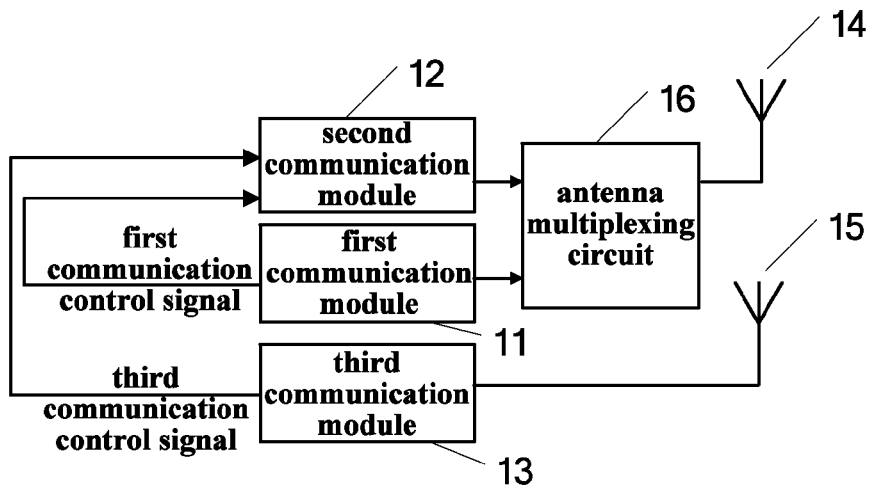
FIG. 7 is a structure diagram of a communication terminal according to a second embodiment of the present invention.

Exemplarily, as shown in FIG. 7, on the basis of the terminal shown in FIG. 1, the terminal further includes:

a third antenna 15, adapted to receive a third communication signal from a third correspondent node, or transmit a third communication signal to the third correspondent node; and a third communication module 13, adapted to receive the third communication signal from the third antenna after the third antenna receives the third communication signal from the third correspondent node, or transmit the third communication signal to the third antenna before the third antenna transmits the third communication signal to the third correspondent node;

where the third communication module 13 is further adapted to, when transmitting the third communication signal to the third antenna, generate a third communication control signal for controlling the second communication module; and the second communication module 12 is further adapted to receive the third communication control signal, and stop transmission of the second communication signal between the second communication module and the second antenna in accordance with the first communication control signal and the third communication control signal.

Specifically, the second communication module, when receiving only the first communication control signal, stops receiving the transmission of the second communication signal in accordance with the first communication control signal; or the second communication module, when receiving only the third communication control signal, stops receiving the transmission of the second communication signal in accordance with the third communication control signal; or the second communication module, when receiving the first communication control signal and the third communication control signal, stops receiving the transmission of the second communication signal in accordance with the first communication control signal and the third communication control signal.

Optionally, the second communication module is a GPS module. The third communication module may adopt, but is not limited to, a GSM module, a CDMA (Code-division multiple access) module or a WCDMA (Wideband Code-division multiple access) module.

When the third communication module is a GSM module, the third communication control signal is a GSM blanking signal.

Figure 8:
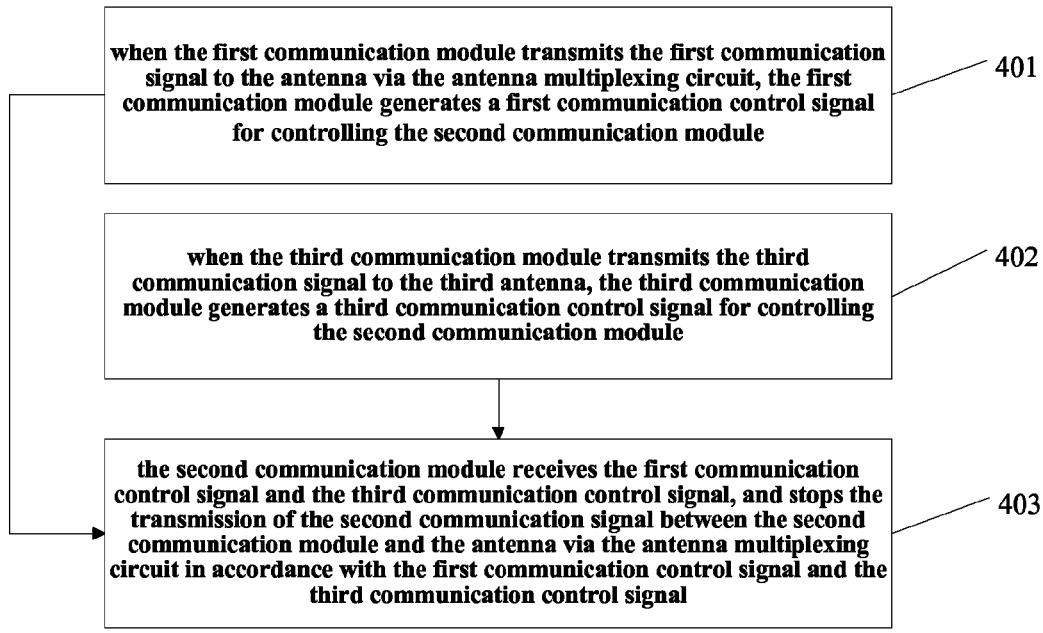
FIG. 8 is a flow chart of a method for controlling data communication, which is applied to the terminal illustrated in FIG. 7, according to the second embodiment of the present invention.

Accordingly, as shown in FIG. 8, a data communication method is provided according to the embodiment of the present invention, which is applied to the above communication terminal shown in FIG. 7, and the method includes:

401, when the first communication module transmits the first communication signal to the antenna via the antenna multiplexing circuit, generating a first communication control signal for controlling the second communication module;

402, when the third communication module transmits the third communication signal to the third antenna, generating a third communication control signal for controlling the second communication module; and

403, receiving, by the second communication module, the first communication control signal and the third communication control signal, and stopping, by the second communication module, the transmission of the second communication signal between the second communication module and the antenna via the antenna multiplexing circuit in accordance with the first communication control signal and the third communication control signal.

In the embodiment of the present invention, when the above first communication module is a BT module or a WLAN module, the second communication module is a GPS module, and the third communication module is a GSM module, a CDMA module, a WCDMA module or the like, the BT module, the WLAN module, the GPS module and the GSM module (alternatively, the CDMA module or the WCDMA module) can work together, and signal interferences between the modules when the modules work together are reduced.

Figure 9:
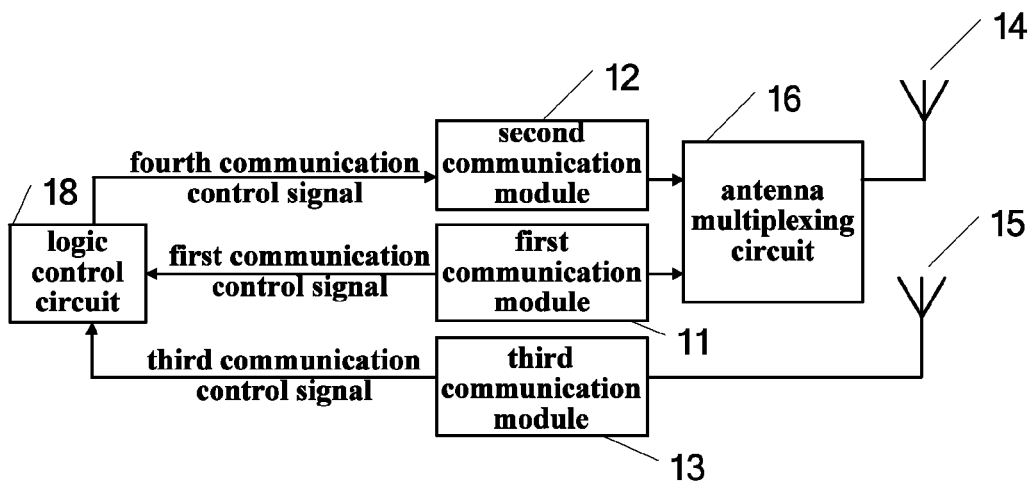
FIG. 9 is a structure diagram of another communication terminal according to the second embodiment of the present invention.

Exemplarily, as shown in FIG. 9, the terminal further includes a logic control circuit 18, where the first communication module 11 is connected with the second communication module via the logic control circuit, and is adapted to transmit the first communication control signal to the logic control circuit;

the third communication module 13 is connected with the second communication module via the logic control circuit, and is adapted to transmit the third communication control signal to the logic control circuit;

the logic control circuit 18 is adapted to receive the first communication control signal and the third communication control signal, and generate a fourth communication control signal for controlling the second communication module in accordance with the first communication control signal and the third communication control signal; and the second communication module 12 is further adapted to receive the fourth communication control signal, and stop the transmission of the second communication signal between the second communication module and the second antenna in accordance with the fourth communication control signal.

Optionally, the first communication module is a BT module and/or a WLAN module, and the second communication module is a GPS module. The third communication module may be but is not limited to a GSM module, a CDMA module or a WCDMA module.

Figure 10:
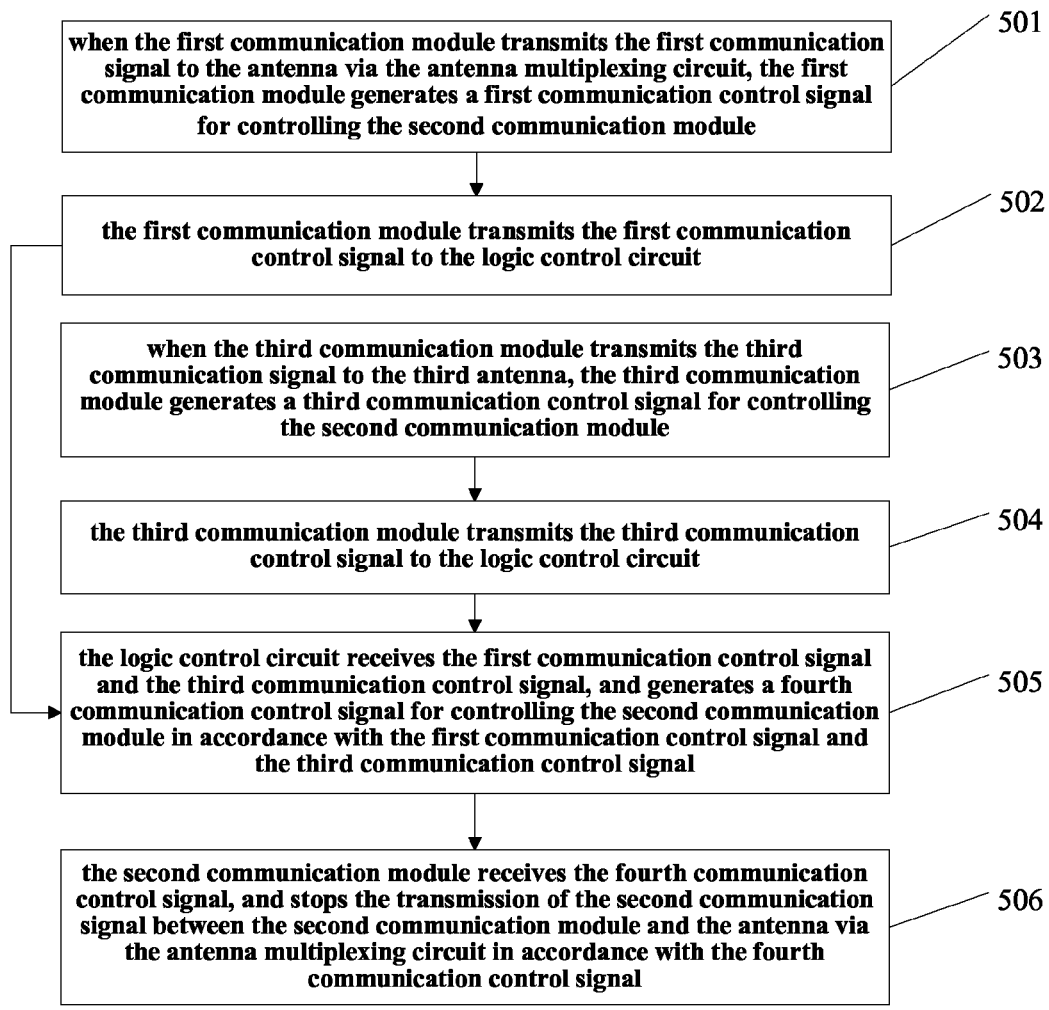
FIG. 10 is a flow chart of a method for controlling data communication, which is applied to the terminal illustrated in FIG. 9, according to the second embodiment of the present invention.

Accordingly, as shown in FIG. 10, a data communication method is provided according to the embodiment of the present invention, which is applied to the above communication terminal shown in FIG. 9, and the method includes:

501, when the first communication module transmits the first communication signal to the antenna via the antenna multiplexing circuit, generating a first communication control signal for controlling the second communication module;

502, transmitting, by the first communication module, the first communication control signal to the logic control circuit;

503, generating, by the third communication module, a third communication control signal for controlling the second communication module when transmitting the third communication signal to the third antenna;

504, transmitting, by the third communication module, the third communication control signal to the logic control circuit;

505, receiving, by the logic control circuit, the first communication control signal and the third communication control signal, and generating, by the logic control circuit, a fourth communication control signal for controlling the second communication module in accordance with the first communication control signal and the third communication control signal; and

506, receiving, by the second communication module, the fourth communication control signal, and stopping, by the second communication module, the transmission of the second communication signal between the second communication module and the antenna via the antenna multiplexing circuit in accordance with the fourth communication control signal.

In the embodiment of the present invention, when the above first communication module is a BT module or a WLAN module, the second communication module is a GPS module, and the third communication module is a GSM module, a CDMA module, a WCDMA module or the like, the BT module, the WLAN module, the GPS module and the GSM module (alternatively, the CDMA module or the WCDMA module) can work together, and signal interferences between the modules when the modules work together are reduced.

A specific application will be given below, where the first communication module is a BT module, the second communication module is a GPS module, and the third communication module is a GSM module.

When a user uses the BT module to answer a phone, the GSM module transmits a GSM signal by taking 577 us, and the BT module transmits a BT voice signal by taking 1.25 ms. Since the GSM module and the BT module are two independent modules, transmitting the GSM signal by the GSM module and transmitting the BT voice signal by the BT module may be performed continuously in time, or may not be performed continuously in time.

For example, transmitting the GSM signal by the GSM module and transmitting the BT voice signal by the BT module may be performed continuously in time without time overlapping. For example, the BT module transmits the BT voice signal immediately after the GSM module transmits the GSM signal, so the fourth communication control signal generated in accordance with the first communication control signal (i.e., the BT TX signal) and the third communication control signal (i.e., the GSM blanking signal) will control the GPS module to stop receiving the GPS signal within a time period of (577 us+1.25 ms). After the BT module and the GSM module transmit their respective communication signals, the GPS module restarts to receive the GPS signals during 20 ms of the transmission time interval of the two BT signals; and the GPS module stops receiving the GPS signal again when the BT module and the GSM module start to transmit their next respective communication signals. Obviously, the GPS module stops working only in a very short time, which will not affect normal reception of the GPS signal, therefore, the GPS and the BT can work together with the size of the terminal reduced.

As another example, transmitting the GSM signal by the GSM module and transmitting the BT voice signal by the BT module may be performed continuously in time with partly time overlapping. For example, during the transmission of the GSM signal by the GSM module, the BT module transmits a BT voice signal at for example the $300^{th}$ us, then the fourth communication control signal generated in accordance with the first communication control signal (i.e., the BT TX signal) and the third communication control signal (i.e., the GSM blanking signal) will control the GPS module to stop receiving the GPS signal within a time period of (300 us+1.25 ms). The GPS module restarts to receive the GPS signal after the BT module and the GSM module transmit their respective communication signals; and the GPS module stops receiving the GPS signal again when the BT module and the GSM module start to transmit their next respective communication signals.

As a further example, transmitting the GSM signal by the GSM module and transmitting the BT voice signal by the BT module are not be performed continuously in time. The BT module may transmit the BT voice signal within a certain time interval after the GSM transmits the GSM signal; or the GSM may transmit the GSM signal within a certain time interval after the BT module transmits the BT voice signal. No matter which module transmits the signal firstly, the GPS module stops receiving the GPS signal during the transmission of the signal by the module, and the GPS module restarts to receive the GPS signal after the module transmits the signal; and when the other module transmits the signal, the GPS module stops receiving the GPS signals again during the transmission of the signal by the other module, and the GPS module restarts to receive the GPS signal after the other module transmits the signal.

The Third Embodiment

Figure 11:
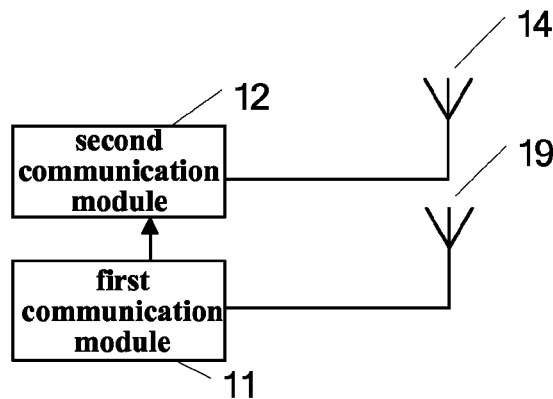
FIG. 11 is a structure diagram of a communication terminal according to a third embodiment of the present invention.

Exemplarily, as shown in FIG. 11, on the basis of the terminal shown in FIG. 1, the first antenna 14 and the second antenna 19 are two different antennas.

In a case that the first communication module transmits the first communication signal to the first antenna and at the same time the second communication signal is transmitted between the second communication module and the second antenna, signal interference occurs between the first communication module and the second communication module.

Specifically, the first communication module includes but is not limited to a GSM module, a CDMA module or a WCDMA module, and the second communication module is a GPS module, a BT module or a WLAN module.

In the embodiments of the invention, by controlling the first communication module and the second communication module to transmit at different times, the GSM module (alternatively, the CDMA module or the WCDMA module) and the GPS module (alternatively, the BT module or the WLAN module) can work together with the signal interference between the GSM module (alternatively, the CDMA module or the WCDMA module) and the GPS module (alternatively, the BT module or the WLAN module) reduced.

The above descriptions are merely specific embodiments of the present invention, which should not be interpreted as limiting the present invention. Any alternations and modifications made by those skilled in the art within the technical scope disclosed by the present invention should fall within the protection scope of the present invention. Therefore, the protection scope of the present invention should be limited by the protection scope of the claims.

The invention claimed is:

1. A communication terminal, comprising:
   a first antenna, adapted to receive a first communication signal from a first correspondent node or transmit a first communication signal to the first correspondent node;
   a first communication module, adapted to receive the first communication signal from the first antenna after the first antenna receives the first communication signal from the first correspondent node, or transmit the first communication signal to the first antenna before the first antenna transmits the first communication signal to the first correspondent node;
   a second antenna, adapted to receive a second communication signal from a second correspondent node or transmit a second communication signal to the second correspondent node; and
   a second communication module, adapted to receive the second communication signal from the second antenna after the second antenna receives the second communication signal from the second correspondent node, or transmit the second communication signal to the second antenna before the second antenna transmits the second communication signal to the second correspondent node;
   wherein
   the first communication module is further adapted to, when transmitting the first communication signal to the first antenna, generate a first communication control signal to control the second communication module; and
   the second communication module is further adapted to receive the first communication control signal, and stop the transmission of the second communication signal between the second communication module and the second antenna in accordance with the first communication control signal, and wherein the first antenna and the second antenna are the same antenna, and the terminal further comprises an antenna multiplexing circuit, wherein the first communication module is connected with the antenna via the antenna multiplexing circuit;

the second communication module is connected with the antenna via the antenna multiplexing circuit; and the antenna multiplexing circuit has an end connected with the first communication module and the second communication module, and another end connected with the antenna, and is adapted to transmit a wireless communication signal transmitted by either of the first communication module and the second communication module to the antenna, and transmit a wireless communication signal received by the antenna to a corresponding one of the first communication module and the second communication module, and wherein the terminal further comprises a logic control circuit, wherein the first communication module comprises a first sub-communication module and a second sub-communication module;

the first sub-communication module is connected with the second communication module via the logic control circuit, and is adapted to transmit a first sub-communication signal to the first antenna, and when transmitting the first sub-communication signal, generate a first sub-communication control signal and transmit the first sub-communication control signal to the logic control circuit;

the second sub-communication module is connected with the second communication module via the logic control circuit, and is adapted to transmit a second sub-communication signal to the first antenna, and when transmitting the second sub-communication signal, generate a second sub-communication control signal and transmit the second sub-communication control signal to the logic control circuit; and the logic control circuit is adapted to receive the first sub-communication control signal and the second sub-communication control signal, and generate the first communication control signal to control the second communication module in accordance with the first sub-communication control signal and the second sub-communication control signal.

2. A communication terminal, comprising:

a first antenna, adapted to receive a first communication signal from a first correspondent node or transmit a first communication signal to the first correspondent node;

a first communication module, adapted to receive the first communication signal from the first antenna after the first antenna receives the first communication signal from the first correspondent node, or transmit the first communication signal to the first antenna before the first antenna transmits the first communication signal to the first correspondent node;

a second antenna, adapted to receive a second communication signal from a second correspondent node or transmit a second communication signal to the second correspondent node; and a second communication module, adapted to receive the second communication signal from the second antenna after the second antenna receives the second communication signal from the second correspondent node, or transmit the second communication signal to the second antenna before the second antenna transmits the second communication signal to the second correspondent node;

wherein the first communication module is further adapted to, when transmitting the first communication signal to the first antenna, generate a first communication control signal to control the second communication module; and the second communication module is further adapted to receive the first communication control signal, and stop the transmission of the second communication signal between the second communication module and the second antenna in accordance with the first communication control signal, and wherein the first antenna and the second antenna are the same antenna, and the terminal further comprises an antenna multiplexing circuit, wherein the first communication module is connected with the antenna via the antenna multiplexing circuit;

the second communication module is connected with the antenna via the antenna multiplexing circuit; and the antenna multiplexing circuit has an end connected with the first communication module and the second communication module, and another end connected with the antenna, and is adapted to transmit a wireless communication signal transmitted by either of the first communication module and the second communication module to the antenna, and transmit a wireless communication signal received by the antenna to a corresponding one of the first communication module and the second communication module, and wherein the terminal further comprises:

a third antenna, adapted to receive a third communication signal from a third correspondent node or transmit a third communication signal to the third correspondent node;

a third communication module, adapted to receive the third communication signal from the third antenna after the third antenna receives the third communication signal from the third correspondent node, or transmit the third communication signal to the third antenna before the third antenna transmits the third communication signal to the third correspondent node;

wherein the third communication module is further adapted to, when transmitting the third communication signal to the third antenna, generate a third communication control signal to control the second communication module; and the second communication module is further adapted to receive the third communication control signal, and stop the transmission of the second communication signal between the second communication module and the second antenna in accordance with the first communication control signal and the third communication control signal.

3. The communication terminal according to claim 2, further comprising a logic control circuit, wherein the first communication module is connected with the second communication module via the logic control circuit, and is adapted to transmit the first communication control signal to the logic control circuit;

the third communication module is connected with the second communication module via the logic control circuit, and is adapted to transmit the third communication control signal to the logic control circuit;

the logic control circuit is adapted to receive the first communication control signal and the third communication control signal, and generate a fourth communication control signal to control the second communication module in accordance with the first communication control signal and the third communication control signal; and the second communication module is further adapted to receive the fourth communication control signal, and stop the transmission of the second communication signal between the second communication module and the second antenna in accordance with the fourth communication control signal.

4. A method to control data communication, which is adapted to a communication terminal, the communication terminal comprising:

a first antenna adapted to receive a first communication signal from a first correspondent node or transmit a first communication signal to the first correspondent node;

a first communication module adapted to receive the first communication signal from the first antenna after the first antenna receives the first communication signal from the first correspondent node, or transmit the first communication signal to the first antenna before the first antenna transmits the first communication signal to the first correspondent node;

a second antenna adapted to receive a second communication signal from a second correspondent node or transmit a second communication signal to the second correspondent node;

a second communication module adapted to receive the second communication signal from the second antenna after the second antenna receives the second communication signal from the second correspondent node, or transmit the second communication signal to the second antenna before the second antenna transmits the second communication signal to the second correspondent node;

wherein the method comprises:

when the first communication module transmits the first communication signal to the first antenna, generating a first communication control signal to control the second communication module; and receiving, by the second communication module, the first communication control signal; and stopping, by the second communication module, the transmission of the second communication signal between the second communication module and the second antenna in accordance with the first communication control signal, and wherein the first antenna and the second antenna of the terminal are the same antenna, and the terminal further comprises an antenna multiplexing circuit, the first communication module is connected with the antenna via the antenna multiplexing circuit; the second communication module is connected with the antenna via the antenna multiplexing circuit; and the antenna multiplexing circuit has an end connected with the first communication module and the second communication module, and another end connected with the antenna, and is adapted to transmit a wireless communication signal transmitted by either of the first communication module and the second communication module to the antenna, and transmit a wireless communication signal received by the antenna to a corresponding one of the first communication module and the second communication module; wherein generating a first communication control signal to control the second communication module when the first communication module transmits the first communication signal to the first antenna comprises:

when the first communication module transmits the first communication signal to the antenna via the antenna multiplexing circuit, generating the first communication control signal for controlling the second communication module;

receiving, by the second communication module, the first communication control signal, and stopping, by the second communication module, the transmission of the second communication signal between the second communication module and the second antenna in accordance with the first communication control signal comprises:

receiving, by the second communication module, the first communication control signal, and stopping, by the second communication module, the transmission of the second communication signal between the second communication module and the antenna via the antenna multiplexing circuit in accordance with the first communication control signal, and wherein, the terminal further comprises a logic control circuit, and the first communication module comprises a first sub-communication module and a second sub-communication module, the first sub-communication module is connected with the second communication module via the logic control circuit, and the second sub-communication module is connected with the second communication module via the logic control circuit, wherein generating a first communication control signal for controlling the second communication module when the first communication module transmits the first communication signal to the first antenna comprises:

the first sub-communication module transmits a first sub-communication signal to the antenna via the antenna multiplexing circuit, and when transmitting the first sub-communication signal, generates a first sub-communication control signal and transmits the first sub-communication control signal to the logic control circuit;

the second sub-communication module transmits a second sub-communication signal to the antenna via the antenna multiplexing circuit, and when transmitting the second sub-communication signal, generates a second sub-communication control signal and transmits the second sub-communication control signal to the logic control circuit; and the logic control circuit receives the first sub-communication control signal and the second sub-communication control signal, and generates the first communication control signal to control the second communication module in accordance with the first sub-communication control signal and the second sub-communication control signal.

5. A method to control data communication, which is applied to a communication terminal, the communication terminal comprising:

a first antenna adapted to receive a first communication signal from a first correspondent node or transmit a first communication signal to the first correspondent node;

a first communication module adapted to receive the first communication signal from the first antenna after the first antenna receives the first communication signal from the first correspondent node, or transmit the first communication signal to the first antenna before the first antenna transmits the first communication signal to the first correspondent node;

a second antenna adapted to receive a second communication signal from a second correspondent node or transmit a second communication signal to the second correspondent node;

a second communication module adapted to receive the second communication signal from the second antenna after the second antenna receives the second communication signal from the second correspondent node, or transmit the second communication signal to the second antenna before the second antenna transmits the second communication signal to the second correspondent node;

wherein the method comprises:

when the first communication module transmits the first communication signal to the first antenna, generating a first communication control signal for controlling the second communication module; and receiving, by the second communication module, the first communication control signal; and stopping, by the second communication module, the transmission of the second communication signal between the second communication module and the second antenna in accordance with the first communication control signal, and wherein the first antenna and the second antenna of the terminal are the same antenna, and the terminal further comprises an antenna multiplexing circuit, the first communication module is connected with the antenna via the antenna multiplexing circuit; the second communication module is connected with the antenna via the antenna multiplexing circuit; and the antenna multiplexing circuit has an end connected with the first communication module and the second communication module, and another end connected with the antenna, and is adapted to transmit a wireless communication signal transmitted by either of the first communication module and the second communication module to the antenna, and transmit a wireless communication signal received by the antenna to a corresponding one of the first communication module and the second communication module; wherein generating a first communication control signal for controlling the second communication module when the first communication module transmits the first communication signal to the first antenna comprises:

when the first communication module transmits the first communication signal to the antenna via the antenna multiplexing circuit, generating the first communication control signal for controlling the second communication module;

receiving, by the second communication module, the first communication control signal, and stopping, by the second communication module, the transmission of the second communication signal between the second communication module and the second antenna in accordance with the first communication control signal comprises:

receiving, by the second communication module, the first communication control signal, and stopping, by the second communication module, the transmission of the second communication signal between the second communication module and the antenna via the antenna multiplexing circuit in accordance with the first communication control signal, and wherein, the terminal further comprises: a third antenna adapted to receive a third communication signal from a third correspondent node or transmit a third communication signal to the third correspondent node; and a third communication module adapted to receive the third communication signal from the third antenna after the third antenna receives the third communication signal from the third correspondent node, or transmit the third communication signal to the third antenna before the third antenna transmits the third communication signal to the third correspondent node;

wherein the method further comprises:

when the third communication module transmits the third communication signal to the third antenna, generating a third communication control signal to control the second communication module; and receiving, by the second communication module, the third communication control signal, and stopping, by the second communication module, the transmission of the second communication signal between the second communication module and the second antenna via the antenna multiplexing circuit in accordance with the first communication control signal and the third communication control signal.

6. The method according to claim 5, wherein, the terminal further comprises a logic control circuit, the first communication module is connected with the second communication module via the logic control circuit, and the third communication module is connected with the second communication module via the logic control circuit, wherein the method further comprises:

transmitting, by the first communication module, the first communication control signal to the logic control circuit;

transmitting, by the third communication module, the third communication control signal to the logic control circuit;

receiving, by the logic control circuit, the first communication control signal and the third communication control signal, and generating, by the logic control circuit, a fourth communication control signal to control the second communication module in accordance with the first communication control signal and the third communication control signal; and receiving, by the second communication module, the fourth communication control signal, and stopping, by the second communication module, the transmission of the second communication signal between the second communication module and the second antenna via the antenna multiplexing circuit in accordance with the fourth communication control signal.

* * * * *